US012639692B2

(12) United States Patent
Kung et al.

(10) Patent No.: US 12,639,692 B2
(45) Date of Patent: May 26, 2026

(54) SYSTEMS AND METHODS FOR INTEROPERABILITY AMONG PERSON-TO-PERSON FUNDING APPLICATIONS

(71) Applicant: JPMORGAN CHASE BANK, N.A., New York, NY (US)

(72) Inventors: Sonny Kung, New York, NY (US); Jonathan James, Brooklyn, NY (US); Julie Kimmerling, Brooklyn, NY (US); Jeevan Babu, Scarsdale, NY (US); Seth Wheeler, Chadds Ford, PA (US); Allison Beer, New York, NY (US); Davina Anthony, Mamaroneck, NY (US); Nicholas Peddy, New York, NY (US); John Cuchural, Boston, MA (US); Matt Doup, Brooklyn, NY (US)

( * ) Notice: Subject to any disclaimer, the term of this patent is extended or adjusted under 35 U.S.C. 154(b) by 0 days.

(21) Appl. No.: 18/469,403

(22) Filed: Sep. 18, 2023

(65) Prior Publication Data

US 2024/0095712 A1    Mar. 21, 2024

Related U.S. Application Data

(60) Provisional application No. 63/376,388, filed on Sep. 20, 2022.

(51) Int. Cl.
| | |
|---|---|
| *G06Q 30/00* | (2023.01) |
| *G06Q 20/10* | (2012.01) |
| *G06Q 20/22* | (2012.01) |
| *G06Q 20/38* | (2012.01) |
| *H04L 9/00* | (2022.01) |

(52) U.S. Cl.
CPC ........... *G06Q 20/223* (2013.01); *G06Q 20/10* (2013.01); *G06Q 20/389* (2013.01); *H04L*

*9/50* (2022.05); *G06Q 2220/00* (2013.01); *H04L 2209/56* (2013.01)

(58) Field of Classification Search
CPC ..................................................... G06Q 20/223
USPC ................. 705/39, 1.1, 35, 44, 42, 16, 26.1; 235/380, 492
See application file for complete search history.

(56) References Cited

U.S. PATENT DOCUMENTS

| | | | | |
|---|---|---|---|---|
| 2009/0081989 A1* | 3/2009 | Wuhrer | ................. | H04M 15/55 455/406 |
| 2023/0360007 A1* | 11/2023 | Krishnaswamy | .... | G06Q 20/389 |

OTHER PUBLICATIONS

ProQuestDialogNPL Search History.*
IP.com NPL Search History.*

* cited by examiner

*Primary Examiner* — John H. Holly
(74) *Attorney, Agent, or Firm* — GREENBERG TRAURIG LLP

(57) ABSTRACT

In some aspects, the techniques described herein relate to a method including: aggregating data for use in an interoperable P2P application; transferring funds from a user's account associated with a first disparate P2P funding application to fund an account associated with the interoperable P2P application; transferring the funds from the account associated with the interoperable P2P application to an account associated with a second disparate P2P application; initiating a transfer of the funds from the user's account associated with a second disparate P2P application to a colleague's account associated with the second disparate P2P application; and recording transactions carried out by the interoperable P2P application in a ledger system associated with the interoperable P2P application.

15 Claims, 3 Drawing Sheets

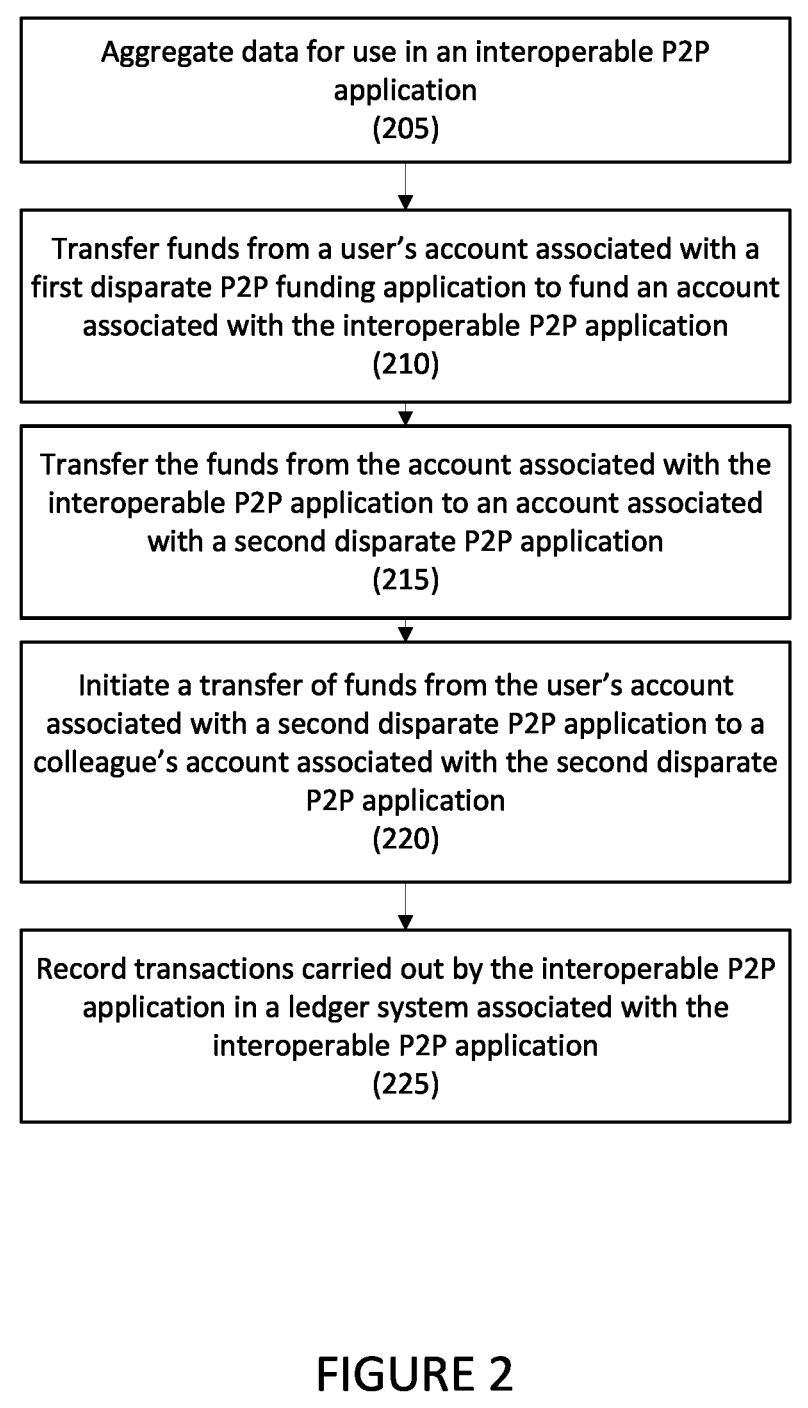

Aggregate data for use in an interoperable P2P
application
(205)

Transfer funds from a user's account associated with a
first disparate P2P funding application to fund an account
associated with the interoperable P2P application
(210)

Transfer the funds from the account associated with the
interoperable P2P application to an account associated
with a second disparate P2P application
(215)

Initiate a transfer of funds from the user's account
associated with a second disparate P2P application to a
colleague's account associated with the second disparate
P2P application
(220)

Record transactions carried out by the interoperable P2P
application in a ledger system associated with the
interoperable P2P application
(225)

FIGURE 2

SYSTEMS AND METHODS FOR INTEROPERABILITY AMONG PERSON-TO-PERSON FUNDING APPLICATIONS

BACKGROUND OF THE INVENTION

1. Field of the Invention

Aspects generally relate to systems and methods for interoperability among person-to-person funding applications.

2. Description of the Related Art

Person to person (P2P) payment applications allow users to pay one another by transferring funds between instances of the application. These applications are generally funded using an associated account such as a demand deposit account (DDA), debit card, etc. Payments received in the application may also be transferred into associated accounts for use in other channels. Conventional P2P apps, however, do not allow cross-platform payments between disparate applications.

SUMMARY

In some aspects, the techniques described herein relate to a method including: aggregating data for use in an interoperable P2P application; transferring funds from a user's account associated with a first disparate P2P funding application to fund an account associated with the interoperable P2P application; transferring the funds from the account associated with the interoperable P2P application to an account associated with a second disparate P2P application; initiating a transfer of the funds from the user's account associated with a second disparate P2P application to a colleague's account associated with the second disparate P2P application; and recording transactions carried out by the interoperable P2P application in a ledger system associated with the interoperable P2P application.

In some aspects, the techniques described herein relate to a method, wherein the interoperable P2P application is a backend application hosted on an implementing organization's technology infrastructure.

In some aspects, the techniques described herein relate to a method, wherein aggregating data is carried out by an aggregation engine accesses as a service of a third-party service provider.

In some aspects, the techniques described herein relate to a method, including: providing, by an implementing organization a client application for execution on a client device, wherein the client application interfaces with the interoperable P2P application.

In some aspects, the techniques described herein relate to a method, wherein the client application provides a graphical user interface for interaction by a user of the client device.

In some aspects, the techniques described herein relate to a system including at least one computer including a processor, wherein the at least one computer is configured to: aggregate data for use in an interoperable P2P application; transfer funds from a user's account associated with a first disparate P2P funding application to fund an account associated with the interoperable P2P application; transfer the funds from the account associated with the interoperable P2P application to an account associated with a second disparate P2P application; initiate a transfer of the funds from the user's account associated with a second disparate P2P application to a colleague's account associated with the second disparate P2P application; and record transactions carried out by the interoperable P2P application in a ledger system associated with the interoperable P2P application.

In some aspects, the techniques described herein relate to a system, wherein the interoperable P2P application is a backend application hosted on an implementing organization's technology infrastructure.

In some aspects, the techniques described herein relate to a system, wherein aggregating data is carried out by an aggregation engine accesses as a service of a third-party service provider.

In some aspects, the techniques described herein relate to a system, wherein the interoperable P2P application is configured to: interface with a client application executing on a client device.

In some aspects, the techniques described herein relate to a system, wherein the client application provides a graphical user interface for interaction by a user of the client device.

In some aspects, the techniques described herein relate to a non-transitory computer readable storage medium, including instructions stored thereon, which instructions, when read and executed by one or more computer processors, cause the one or more computer processors to perform steps including: aggregating data for use in an interoperable P2P application; transferring funds from a user's account associated with a first disparate P2P funding application to fund an account associated with the interoperable P2P application; transferring the funds from the account associated with the interoperable P2P application to an account associated with a second disparate P2P application; initiating a transfer of the funds from the user's account associated with a second disparate P2P application to a colleague's account associated with the second disparate P2P application; and recording transactions carried out by the interoperable P2P application in a ledger system associated with the interoperable P2P application.

In some aspects, the techniques described herein relate to a non-transitory computer readable storage medium, wherein the interoperable P2P application is a backend application hosted on an implementing organization's technology infrastructure.

In some aspects, the techniques described herein relate to a non-transitory computer readable storage medium, wherein aggregating data is carried out by an aggregation engine accesses as a service of a third-party service provider.

In some aspects, the techniques described herein relate to a non-transitory computer readable storage medium, wherein the interoperable P2P application is configured to: interface with a client application executing on a client device.

In some aspects, the techniques described herein relate to a non-transitory computer readable storage medium, wherein the client application provides a graphical user interface for interaction by a user of the client device.

BRIEF DESCRIPTION OF THE DRAWINGS

FIG. 2 shows a method of implementing interoperability among P2P funding applications, in accordance with aspects.

DETAILED DESCRIPTION

Figure 1:
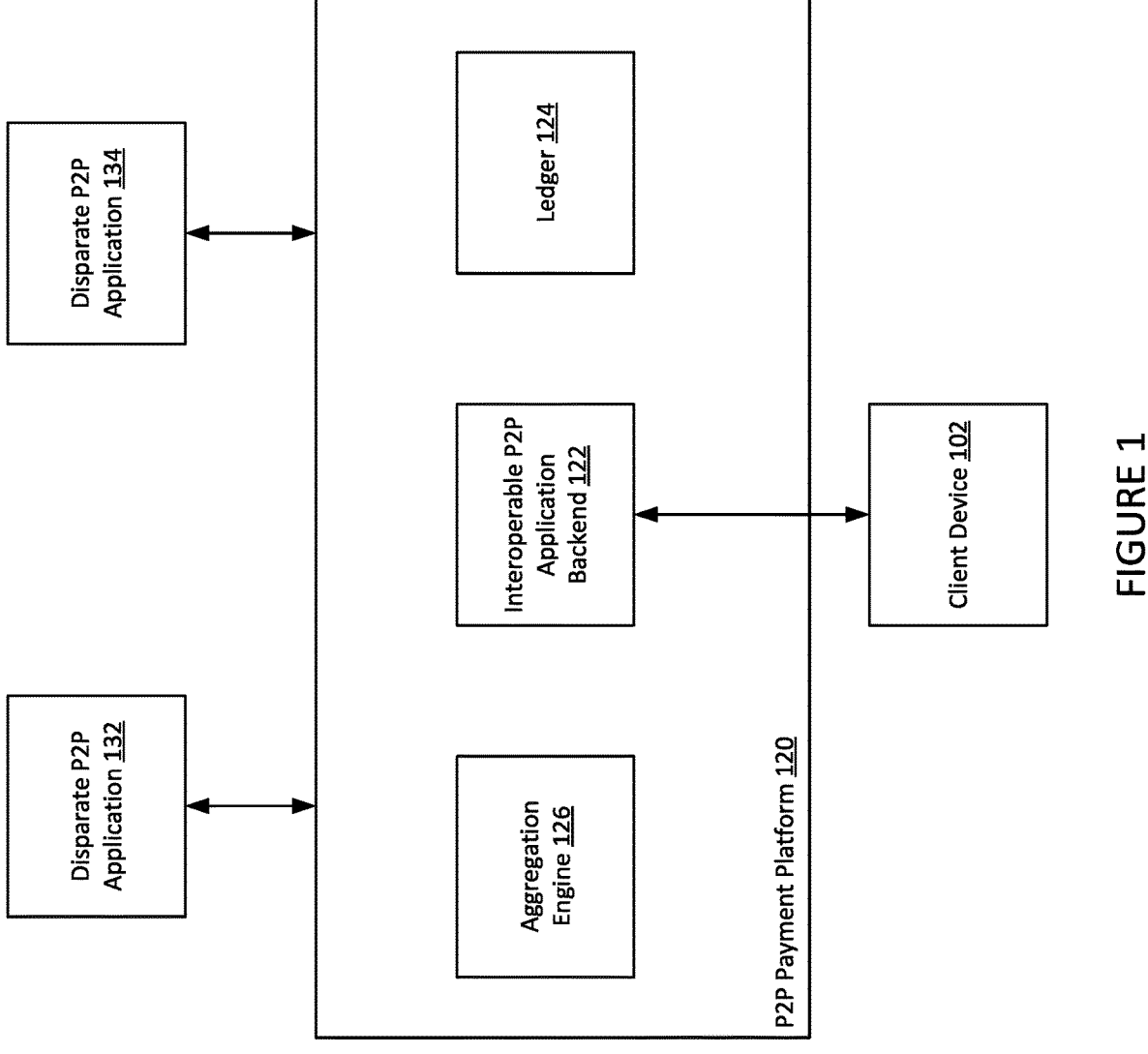
FIG. 1 is a block diagram of a system for interoperability among person-to-person funding applications, in accordance with aspects.

Aspects are directed to a person-to-person (P2P) payment application and platform (referred to herein as an interoperable P2P application) that facilitates sending and receiving fund transfers from other, disparate third-party P2P fund transfer applications, networks, and platforms (referred to herein as disparate P2P applications).

In accordance with aspects, data aggregation may be used in an interoperable P2P application to access a user's disparate P2P payment applications. That is, a user of the interoperable P2P application may have user profiles, accounts, etc., with one or more disparate P2P applications, and may access information from those disparate P2P applications from within the interoperable P2P application's interface via data aggregation techniques.

In accordance with aspects, conventional data aggregation includes collecting data from a plurality of data sources, e.g., for analytical purposes. Data aggregators may be third-parties to end users associated with and using applications, platforms, and/or networks. An aspect of data aggregation may include the third-party data aggregator gaining access to such applications, platforms, and/or networks for use as data sources. Access may be gained e.g., by requesting login credentials from a user of an application and using the credentials to gain access to the application.

Access through data aggregation techniques and/or services may be used to determine information stored in the user's third-party P2P funding applications and display that data in the interface of the interoperable P2P application. Such information may include balances available for transfers, recipients of transfers from an application instance, user directory data from underlying platforms, etc.

In accordance with aspects, a user of an interoperable P2P application may wish to transfer funds to a recipient. The interoperable P2P application may use directories from the user's profiles/accounts associated with disparate P2P applications to build a list of potential recipients for a funds transfer. The recipient may have a user profile and an account associated with a first disparate P2P application. The user may have several user profiles and corresponding accounts with respective P2P applications. For example, the user may have a profile/account associated with the interoperable P2P application. The user may also have a profile/account associated with the first disparate P2P application. Additionally, the user may have a profile/account associated with a second disparate P2P application.

The user, via the interface of the interoperable P2P account, which may use data aggregation access and authorization techniques, may view the user's account status in the first and second disparate P2P applications, where the user may find adequate funds for the transfer to the recipient in the account associated with the second disparate P2P application. The user may find, however, that the account associated with the first disparate P2P application may not have adequate funds to facilitate the transfer to the recipient, and therefore a transfer of funds via the first disparate P2P application may not be immediately possible.

Using the interoperable P2P application, the user may initiate a transfer from an account associated with the first disparate P2P application, to the account associated with the interoperable P2P application, and then to the account associated with the second disparate P2P application. The user may then proceed with the funds transfer from the user's account associated with the first disparate P2P application to the recipient's account associated with the first disparate P2P application.

The transfer of funds to the account associated with the interoperable P2P account, acting as in intermediary account, may happen in the background. That is, the user may indicate, via the interface of the interoperable account, that the user wants to move funds from the user's account associated with the first disparate P2P application directly to the user's account associated with the second disparate P2P application, and the transfer into and out of the account associated with the interoperable P2P application may not be shown in the application's interface.

Aspects may also include the ability to fund the interoperable P2P application with more conventional means such as from a DDA or a debit card. Further, the interoperable P2P application may accept any potential float risk to expedite the funding time for faster access to funds. These funds may then be transferred to accounts associated with disparate P2P applications for use in funding transfers with colleagues having profiles/accounts associated with the disparate P2P applications.

In accordance with aspects, all transactions, including movements of any funds into or out of the interoperable P2P application, are recorded in a ledger system. The ledger system may record the user's individual payments and may also record transactions involving group memberships and split payments. Groups of users may be defined within the interoperable P2P application and transactions associated with the group may be recorded in the ledger system. Additionally, the ledger system may record partial payments made by either the user or individuals associated with the user (e.g., individuals determined to be in the user's directory, and that may be using disparate P2P payment systems) that are applied against transactions on the ledger.

In accordance with aspects, the interoperable P2P account may include functionality to request funds from, e.g., identified directory colleagues using disparate P2P applications. For instance, the interoperable P2P application may allow a user to select colleagues from an aggregated directory of colleagues and send requests for payments to the selected colleagues. The requests may reference, e.g., a transaction with a merchant that the user wishes to divide among the user and selected colleagues. The interoperable P2P application may include logic to divide the total amount of the transaction by the number of selected colleagues plus the user and send the selected colleagues a request for a funds transfer in the amount of the quotient. The interoperable P2P application may determine an appropriate disparate P2P application with which the selected colleagues have associated profiles/accounts to send the request to.

FIG. 1 is a block diagram of a system for interoperability among person-to-person funding applications. System 100 includes P2P payment platform 120, disparate P2P application 132, disparate P2P application 134, and client device 102. P2P payment platform 120 includes interoperable P2P application backend 122, ledger 124, and aggregation engine 126. P2P payment platform 120 may be included in an implementing organization's technology infrastructure, as discussed in more detail, below. Disparate P2P application 132 and disparate P2P application 134 may be backend applications hosted by other organizations. Client device 102 may execute a client application of interoperable P2P application backend 122, and may provide a user interface (e.g., a graphical user interface) with which a user of client device 102 may interact with interoperable P2P application backend 122.

In accordance with aspects, disparate P2P application 132 and disparate P2P application 134 may be in operative communication with aggregation engine 126. While aggregation engine 126 is shown as part of P2P payment platform 120, in some aspects, aggregation engine 126 may be offered as a third-party service of a third party. Aggregation engine 126 may aggregate data exposed by disparate P2P application 132 and disparate P2P application 134 using data aggregation techniques. Aggregation engine 126 may determine information stored disparate P2P application 132 and disparate P2P application 134 and may make the determined information available to P2P application backend 122. 122 may display that data in the interface of a client application executing on client device 102. Such information may include balances available for transfers, recipients of transfers from an application instance, user directory data from underlying platforms, etc.

In accordance with aspects, P2P application backend 122 may receive commands from a client application executing on client device 102 that instruct P2P application backend 122 to transfer available funds from an account associated with P2P application 132 to an account associated with P2P application 134. P2P application backend 122 may transparently and temporarily transfer the requested funds to an account associated with P2P application backend 122 and, when this transfer is complete, initiate another transparent transfer of the requested funds from the account associated with P2P application backend 122 to an account associated with P2P application 134. Ledger 124 may be associated with P2P application backend 122 and may record all transactions executed by P2P application backend 122.

FIG. 2 shows a method of implementing interoperability among P2P funding applications, in accordance with aspects.

At step 205, data aggregation may be used in an interoperable P2P application to access a user's disparate P2P payment applications and display accessed data in the interface of an interoperable P2P application.

At step 210 the interoperable P2P application may transfer funds from a user's account associated with a first disparate P2P funding application to fund an account associated with the interoperable P2P application.

At step 215 the interoperable application may transfer the funds from the account associated with the interoperable P2P application to an account associated with a second disparate P2P application.

At step 220, the interoperable P2P application initiates a transfer of funds from the user's account associated with a second disparate P2P application to a colleague's account associated with the second disparate P2P application.

At step 225, transactions carried out by the interoperable P2P application may be recorded in a ledger system associated with the interoperable P2P application.

Figure 3:
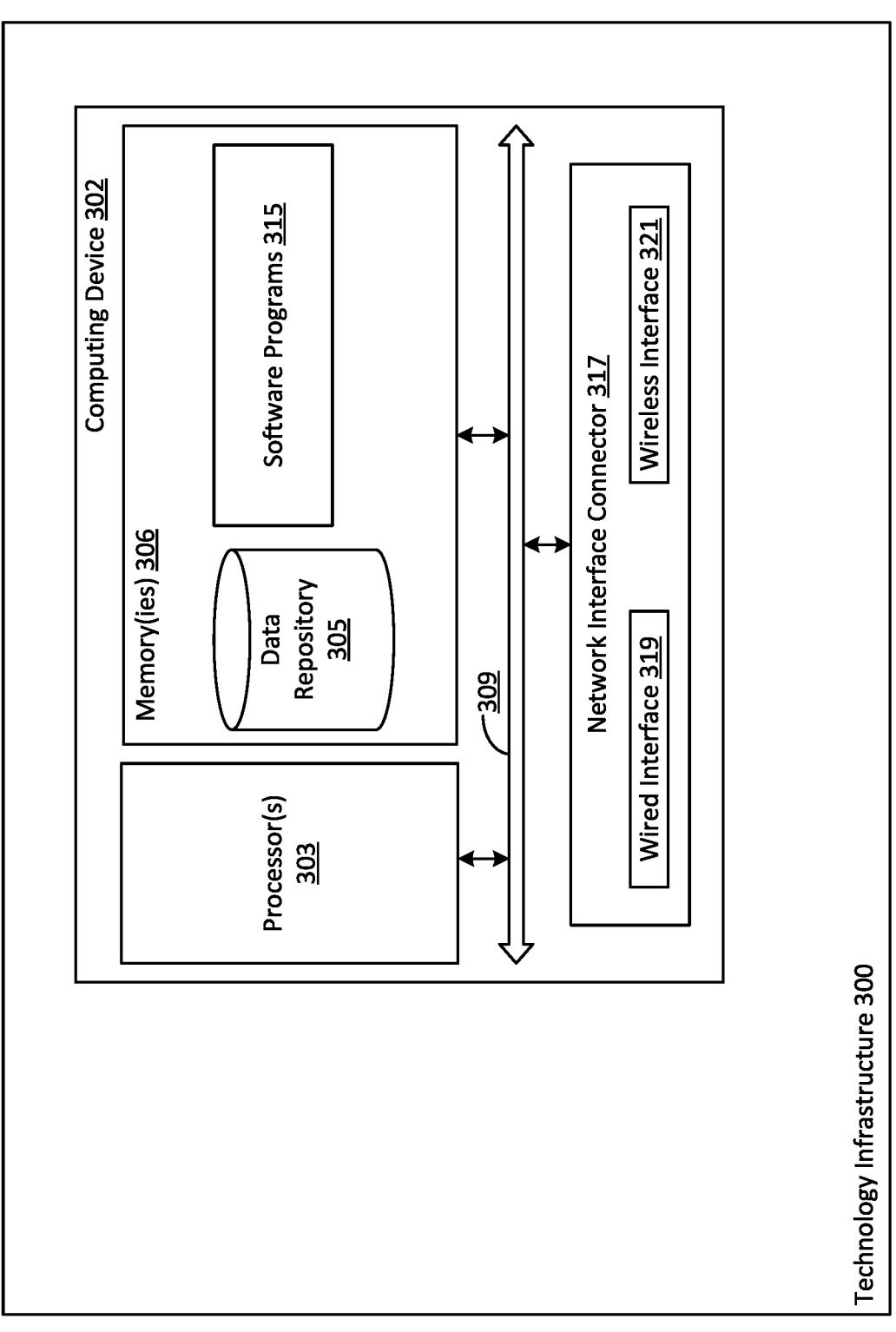
FIG. 3 is a block diagram of a technology infrastructure and computing device for implementing certain aspects of the present disclosure, in accordance with aspects.

FIG. 3 is a block diagram of a technology infrastructure and computing device for implementing certain aspects of the present disclosure, in accordance with aspects. FIG. 3 includes technology infrastructure 300. Technology Infrastructure 300 represents the technology infrastructure of an implementing organization. Technology Infrastructure 300 may include hardware such as servers, client devices, and other computers or processing devices. Technology Infrastructure 300 may include software (e.g., computer) applications that execute on computers and other processing devices. Technology Infrastructure 300 may include computer network mediums, and computer networking hardware and software for providing operative communication between computers, processing devices, software applications, procedures and processes, and logical flows and steps, as described herein.

Exemplary hardware and software that may be implemented in combination where software (such as a computer application) executes on hardware. For instance, technology infrastructure 300 may include webservers, application servers, database servers and database engines, communication servers such as email servers and SMS servers, client devices, etc. The term "service" as used herein may include software that, when executed, receives client service requests and responds to client service requests with data and/or processing procedures. A software service may be a commercially available computer application or may be a custom-developed and/or proprietary computer application. A service may execute on a server. The term "server" may include hardware (e.g., a computer including a processor and a memory) that is configured to execute service software. A server may include an operating system optimized for executing services. A service may be a part of, included with, or tightly integrated with a server operating system. A server may include a network interface connection for interfacing with a computer network to facilitate operative communication between client devices and client software, and/or other servers and services that execute thereon.

Server hardware may be virtually allocated to a server operating system and/or service software through virtualization environments, such that the server operating system or service software shares hardware resources such as one or more processors, memories, system buses, network interfaces, or other physical hardware resources. A server operating system and/or service software may execute in virtualized hardware environments, such as virtualized operating system environments, application containers, or any other suitable method for hardware environment virtualization.

Technology infrastructure 300 may also include client devices. A client device may be a computer or other processing device including a processor and a memory that stores client computer software and is configured to execute client software. Client software is software configured for execution on a client device. Client software may be configured as a client of a service. For example, client software may make requests to one or more services for data and/or processing of data. Client software may receive data from, e.g., a service, and may execute additional processing, computations, or logical steps with the received data. Client software may be configured with a graphical user interface such that a user of a client device may interact with client computer software that executes thereon. An interface of client software may facilitate user interaction, such as data entry, data manipulation, etc., for a user of a client device.

A client device may be a mobile device, such as a smart phone, tablet computer, or laptop computer. A client device may also be a desktop computer, or any electronic device that is capable of storing and executing a computer application (e.g., a mobile application). A client device may include a network interface connector for interfacing with a public or private network and for operative communication with other devices, computers, servers, etc., on a public or private network.

Technology infrastructure 300 includes network routers, switches, and firewalls, which may comprise hardware, software, and/or firmware that facilitates transmission of data across a network medium. Routers, switches, and firewalls may include physical ports for accepting physical network medium (generally, a type of cable or wire—e.g., copper of fiber optic wire/cable) that forms a physical computer network. Routers, switches, and firewalls may also have "wireless" interfaces that facilitate data transmissions via radio waves. A computer network included in technology infrastructure 300 may include both wired and wireless components and interfaces and may interface with servers and other hardware via either wired or wireless communications. A computer network of technology infrastructure 300 may be a private network but may interface with a public network (such as the internet) to facilitate operative communication between computers executing on technology infrastructure 300 and computers executing outside of technology infrastructure 300.

FIG. 3 further depicts exemplary computing device 302. Computing device 302 depicts exemplary hardware that executes the logic that drives the various system components described herein. Servers and client devices may take the form of computing device 302. While shown as internal to technology infrastructure 300, computing device 302 may be external to technology infrastructure 300 and may be in operative communication with a computing device internal to technology infrastructure 300.

In accordance with aspects, system components such as a P2P application backend, and aggregation engine, a ledger system, client devices, servers, various database engines and database services, and other computer applications and logic may include, and/or execute on, components and configurations the same, or similar to, computing device 302.

Computing device 302 includes a processor 303 coupled to a memory 306. Memory 306 may include volatile memory and/or persistent memory. The processor 303 executes computer-executable program code stored in memory 306, such as software programs 315. Software programs 315 may include one or more of the logical steps disclosed herein as a programmatic instruction, which can be executed by processor 303. Memory 306 may also include data repository 305, which may be nonvolatile memory for data persistence. The processor 303 and the memory 306 may be coupled by a bus 309. In some examples, the bus 309 may also be coupled to one or more network interface connectors 317, such as wired network interface 319, and/or wireless network interface 321. Computing device 302 may also have user interface components, such as a screen for displaying graphical user interfaces and receiving input from the user, a mouse, a keyboard and/or other input/output components (not shown).

In accordance with aspects, services, modules, engines, etc., described herein may provide one or more application programming interfaces (APIs) in order to facilitate communication with related/provided computer applications and/or among various public or partner technology infrastructures, data centers, or the like. APIs may publish various methods and expose the methods, e.g., via API gateways. A published API method may be called by an application that is authorized to access the published API method. API methods may take data as one or more parameters or arguments of the called method. In some aspects, API access may be governed by an API gateway associated with a corresponding API. In some aspects, incoming API method calls may be routed to an API gateway and the API gateway may forward the method calls to internal services/modules/engines that publish the API and its associated methods.

A service/module/engine that publishes an API may execute a called API method, perform processing on any data received as parameters of the called method, and send a return communication to the method caller (e.g., via an API gateway). A return communication may also include data based on the called method, the method's data parameters and any performed processing associated with the called method.

API gateways may be public or private gateways. A public API gateway may accept method calls from any source without first authenticating or validating the calling source. A private API gateway may require a source to authenticate or validate itself via an authentication or validation service before access to published API methods is granted. APIs may be exposed via dedicated and private communication channels such as private computer networks or may be exposed via public communication channels such as a public computer network (e.g., the internet). APIs, as discussed herein, may be based on any suitable API architecture. Exemplary API architectures and/or protocols include SOAP (Simple Object Access Protocol), XML-RPC, REST (Representational State Transfer), or the like.

The various processing steps, logical steps, and/or data flows depicted in the figures and described in greater detail herein may be accomplished using some or all of the system components also described herein. In some implementations, the described logical steps or flows may be performed in different sequences and various steps may be omitted. Additional steps may be performed along with some, or all of the steps shown in the depicted logical flow diagrams. Some steps may be performed simultaneously. Some steps may be performed using different system components. Accordingly, the logical flows illustrated in the figures and described in greater detail herein are meant to be exemplary and, as such, should not be viewed as limiting. These logical flows may be implemented in the form of executable instructions stored on a machine-readable storage medium and executed by a processor and/or in the form of statically or dynamically programmed electronic circuitry.

The system of the invention or portions of the system of the invention may be in the form of a "processing device," a "computing device," a "computer," an "electronic device," a "mobile device," a "client device," a "server," etc. As used herein, these terms (unless otherwise specified) are to be understood to include at least one processor that uses at least one memory. The at least one memory may store a set of instructions. The instructions may be either permanently or temporarily stored in the memory or memories of the processing device. The processor executes the instructions that are stored in the memory or memories in order to process data. A set of instructions may include various instructions that perform a particular step, steps, task, or tasks, such as those steps/tasks described above, including any logical steps or logical flows described above. Such a set of instructions for performing a particular task may be characterized herein as an application, computer application, program, software program, service, or simply as "software." In one aspect, a processing device may be or include a specialized processor. As used herein (unless otherwise indicated), the terms "module," and "engine" refer to a computer application that executes on hardware such as a server, a client device, etc. A module or engine may be a service.

As noted above, the processing device executes the instructions that are stored in the memory or memories to process data. This processing of data may be in response to commands by a user or users of the processing device, in response to previous processing, in response to a request by another processing device and/or any other input, for example. The processing device used to implement the invention may utilize a suitable operating system, and instructions may come directly or indirectly from the operating system.

The processing device used to implement the invention may be a general-purpose computer. However, the processing device described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

It is appreciated that in order to practice the method of the invention as described above, it is not necessary that the processors and/or the memories of the processing device be physically located in the same geographical place. That is, each of the processors and the memories used by the processing device may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing device what to do with the data being processed.

Further, it is appreciated that the instructions or set of instructions used in the implementation and operation of the invention may be in a suitable form such that the processing device may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing device, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing device, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing device, utilized to hold the set of instructions and/or the data used in the invention may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by a processor.

Further, the memory or memories used in the processing device that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing device or machines that are used to implement the invention. As used herein, a user interface includes any hardware, software, or combination of hardware and software used by the processing device that allows a user to interact with the processing device. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing device as it processes a set of instructions and/or provides the processing device with information. Accordingly, the user interface is any device that provides communication between a user and a processing device. The information provided by the user to the processing device through the user interface may be in the form of a command, a selection of data, or some other input, for example.

As discussed above, a user interface is utilized by the processing device that performs a set of instructions such that the processing device processes data for a user. The user interface is typically used by the processing device for interacting with a user either to convey information or receive information from the user. However, it should be appreciated that in accordance with some aspects of the system and method of the invention, it is not necessary that a human user actually interact with a user interface used by the processing device of the invention. Rather, it is also contemplated that the user interface of the invention might interact, i.e., convey and receive information, with another processing device, rather than a human user. Accordingly, the other processing device might be characterized as a user. Further, it is contemplated that a user interface utilized in the system and method of the invention may interact partially with another processing device or processing devices, while also interacting partially with a human user.

It will be readily understood by those persons skilled in the art that the present invention is susceptible to broad utility and application. Many aspects and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications, or equivalent arrangements.

The invention claimed is:

1. A method comprising:
aggregating data for use in an interoperable person to person (P2P) application;
transferring funds from a user's account associated with a first disparate P2P funding application to fund an account associated with the interoperable P2P application;
transferring the funds from the account associated with the interoperable P2P application to an account associated with a second disparate P2P application, wherein the first disparate P2P funding application and the second disparate P2P funding application are forbidden from transactional communication with each other;
initiating a transfer of the funds from the user's account associated with a second disparate P2P application to a colleague's account associated with the second disparate P2P application; and
recording transactions carried out by the interoperable P2P application in a ledger system associated with the interoperable P2P application.

2. The method of claim 1, wherein the interoperable P2P application is a backend application hosted on an implementing organization's technology infrastructure.

3. The method of claim 1, wherein aggregating data is carried out by an aggregation engine accesses as a service of a third-party service provider.

4. The method of claim 1, comprising:
providing, by an implementing organization a client application for execution on a client device, wherein the client application interfaces with the interoperable P2P application.

5. The method of claim 4, wherein the client application provides a graphical user interface for interaction by a user of the client device.

6. A system comprising at least one computer including a processor, wherein the at least one computer is configured to:
aggregate data for use in an interoperable person to person (P2P) application;
transfer funds from a user's account associated with a first disparate P2P funding application to fund an account associated with the interoperable P2P application;
transfer the funds from the account associated with the interoperable P2P application to an account associated with a second disparate P2P application, wherein the first disparate P2P funding application and the second disparate P2P funding application are forbidden from transactional communication with each other;
initiate a transfer of the funds from the user's account associated with a second disparate P2P application to a colleague's account associated with the second disparate P2P application; and
record transactions carried out by the interoperable P2P application in a ledger system associated with the interoperable P2P application.

7. The system of claim 6, wherein the interoperable P2P application is a backend application hosted on an implementing organization's technology infrastructure.

8. The system of claim 6, wherein aggregating data is carried out by an aggregation engine accesses as a service of a third-party service provider.

9. The system of claim 6, wherein the interoperable P2P application is configured to:
interface with a client application executing on a client device.

10. The system of claim 9, wherein the client application provides a graphical user interface for interaction by a user of the client device.

11. A non-transitory computer readable storage medium, including instructions stored thereon, which instructions, when read and executed by one or more computer processors, cause the one or more computer processors to perform steps comprising:
aggregating data for use in an interoperable person to person (P2P) application;

transferring funds from a user's account associated with a first disparate P2P funding application to fund an account associated with the interoperable P2P application;

transferring the funds from the account associated with the interoperable P2P application to an account associated with a second disparate P2P application, wherein the first disparate P2P funding application and the second disparate P2P funding application are forbidden from transactional communication with each other;

initiating a transfer of the funds from the user's account associated with a second disparate P2P application to a colleague's account associated with the second disparate P2P application; and recording transactions carried out by the interoperable P2P application in a ledger system associated with the interoperable P2P application.

12. The non-transitory computer readable storage medium of claim 11, wherein the interoperable P2P application is a backend application hosted on an implementing organization's technology infrastructure.

13. The non-transitory computer readable storage medium of claim 11, wherein aggregating data is carried out by an aggregation engine accesses as a service of a third-party service provider.

14. The non-transitory computer readable storage medium of claim 11, wherein the interoperable P2P application is configured to:

interface with a client application executing on a client device.

15. The non-transitory computer readable storage medium of claim 14, wherein the client application provides a graphical user interface for interaction by a user of the client device.

* * * * *